(12) United States Patent
Cabodi et al.

(10) Patent No.: US 9,284,208 B2
(45) Date of Patent: Mar. 15, 2016

(54) REFRACTORY BLOCK AND GLASS-MELTING FURNACE

(75) Inventors: Isabelle Cabodi, Cavaillon (FR); Michel Gaubil, Les Angles (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 136 days.

(21) Appl. No.: 14/234,282

(22) PCT Filed: Jul. 16, 2012

(86) PCT No.: PCT/IB2012/053633
§ 371 (c)(1),
(2), (4) Date: Feb. 28, 2014

(87) PCT Pub. No.: WO2013/014573
PCT Pub. Date: Jan. 31, 2013

(65) Prior Publication Data
US 2014/0196504 A1 Jul. 17, 2014

(30) Foreign Application Priority Data

Jul. 22, 2011 (FR) ...................................... 11 56706

(51) Int. Cl.
*C03B 5/43* (2006.01)
*C04B 35/484* (2006.01)
*F27D 1/00* (2006.01)

(52) U.S. Cl.
CPC ................. *C03B 5/43* (2013.01); *C04B 35/484* (2013.01); *F27D 1/0006* (2013.01); *C04B 2235/3201* (2013.01); *C04B 2235/3225* (2013.01); *C04B 2235/3248* (2013.01);
(Continued)

(58) Field of Classification Search
CPC ................................ C04B 35/484; C03B 5/43
See application file for complete search history.

(56) References Cited

U.S. PATENT DOCUMENTS

| 2,438,552 | A | 3/1948 | Field |
| 3,632,359 | A | 1/1972 | Alper et al. |

(Continued)

FOREIGN PATENT DOCUMENTS

| EP | 0 939 065 A1 | 9/1999 |
| EP | 1 810 956 A1 | 7/2007 |

(Continued)

OTHER PUBLICATIONS

Oct. 25, 2012 International Search Report issued in International Patent Application No. PCT/IB2012/053633.
(Continued)

*Primary Examiner* — Karl Group
(74) *Attorney, Agent, or Firm* — Oliff PLC

(57) ABSTRACT

The present invention relates to a fused refractory product having the following average chemical composition, as a percentage by weight on the basis of the oxides and for a total of 100%: $ZrO_2$: 60.0%-80.0%; $SiO_2$: 4.0%-10.0%; $Al_2O_3$: balance to 100%; $Y_2O_3 \leq 5.0\%$; $Na_2O+K_2O+B_2O_3 \geq 0.3\%$ and $SiO_2/(Na_2O+K_2O+B_2O_3) \geq 5.0$; other oxide species: $\leq 2.0\%$; the ratio of the $ZrO_2/Al_2O_3$ weight contents being between 2.0 and 6.0.

16 Claims, 1 Drawing Sheet

(52) U.S. Cl.
CPC .............. *C04B 2235/3409* (2013.01); *C04B 2235/3418* (2013.01); *C04B 2235/72* (2013.01); *C04B 2235/95* (2013.01); *C04B 2235/9607* (2013.01); *C04B 2235/9692* (2013.01)

(56) References Cited

U.S. PATENT DOCUMENTS

| | | | | |
|---|---|---|---|---|
| 4,053,321 A | * | 10/1977 | Okumiya et al. | ............ 501/105 |
| 2009/0176642 A1 | | 7/2009 | Tomura et al. | |
| 2011/0105296 A1 | | 5/2011 | Boussant-Roux et al. | |

FOREIGN PATENT DOCUMENTS

| | | |
|---|---|---|
| FR | 1 208 577 | 2/1960 |
| FR | 75 893 | 8/1961 |
| FR | 82 310 | 1/1964 |
| GB | 1 036 893 | 7/1966 |
| JP | 73011324 * | 4/1973 |
| JP | S48-32408 B1 | 10/1973 |
| JP | 2009-155150 A | 7/2009 |

OTHER PUBLICATIONS

Oct. 25, 2012 Written Opinion issued in International Patent Application No. PCT/IB2012/053633.

Feb. 9, 2012 Written Opinion issued in French Patent Application No. FR1156706 (with English Translation).

Jan. 23, 2015 Office Action issued in Japanese Patent Application No. 2014-520762.

* cited by examiner

REFRACTORY BLOCK AND GLASS-MELTING FURNACE

FIELD OF TECHNOLOGY

The invention relates to an AZS (Alumina-Zirconia-Silica) fused refractory product.

PRIOR ART

Among the refractory products, a distinction is made between fused products, well known for the construction of glass-melting furnaces, and sintered products.

In contrast to sintered products, fused products most often comprise an intergranular vitreous phase joining the crystalline grains together. The problems posed by sintered products and fused products, and the technical solutions adopted for solving them, are therefore generally different. Therefore a composition developed for manufacturing a sintered product is not a priori usable as such for manufacturing a fused product, and vice versa.

Fused products, often called "electrocast", are obtained by melting a mixture of suitable raw materials in an arc furnace or by any other technique that is suitable for these products. The bath of molten material is then cast in a mold, and then the product obtained undergoes a controlled cooling cycle.

Among the fused products, the AZS electrocast products, i.e. comprising predominantly alumina ($Al_2O_3$), zirconia ($ZrO_2$) and silica ($SiO_2$), have been known for several decades. U.S. Pat. No. 2,438,552 describes one of the first improvements made to this type of product. The authors recommend adding $Na_2O$ (1-2.2%) and MgO/CaO (0.2-0.8%) to address problems of feasibility concerning products comprising less than 70% of $Al_2O_3$, from 14 to 40% of $ZrO_2$ and from 9 to 12% of $SiO_2$.

The AZS products currently marketed by Saint-Gobain SEFPRO, such as ER-1681, ER-1685, or ER-1711, contain from 45 to 50% of $Al_2O_3$, from 32 to 41% of $ZrO_2$, from 12 to 16% of $SiO_2$ and about 1% of $Na_2O$.

The electrocast products with very high zirconia content, i.e. comprising more than 85 wt % of zirconia ($ZrO_2$), are renowned for their quality of very high corrosion resistance without coloring the glass produced and without generating defects.

The product ER-1195 produced and marketed by Saint-Gobain SEFPRO is now widely used in glass-melting furnaces. Its chemical composition comprises about 94% of zirconia, 4 to 5% of silica, about 1% of alumina, 0.3% of sodium oxide and less than 0.05 wt % of $P_2O_5$. It is typical of the products with very high zirconia content used for glass furnaces.

These products offer good performance and are very suitable for constructing glassmaking furnaces. However, they cannot always be used, notably for the blocks constituting the tanks or the throats of glassmaking furnaces. In fact, the outer face of these blocks is cooled and there is therefore a large temperature difference between the internal and external faces of the blocks of the furnace. It is then important that these blocks have a high thermal conductivity, for the cooling to be efficient.

Moreover, there is a constant need to improve the operating conditions of glassmaking furnaces as well as the quality of the glass, notably for new compositions of glass for particularly demanding applications.

In particular, it is always useful to improve the resistance to corrosion by molten glass. There is therefore a need for a fused product that has very good resistance to corrosion by molten glass as well as high thermal conductivity.

The present invention aims to satisfy this need.

SUMMARY OF THE INVENTION

More particularly, it relates to a fused refractory product having the following average chemical composition, in percentage by weight based on the oxides and for a total of 100%:
  $ZrO_2$: 60.0%-80.0%;
  $SiO_2$: 4.0%-10.0%;
  $Al_2O_3$: complement to 100%;
  $Y_2O_3$ 5.0%;
  $Na_2O+K_2O+B_2O_3 \geq 0.3\%$ and $SiO_2/(Na_2O+K_2O+B_2O_3) \geq 5.0$;
  other oxide species: $\leq 2.0\%$;
with a ratio of the contents by weight $ZrO_2/Al_2O_3$ between 2.0 and 6.0.

As will be seen in more detail later in the description, a product according to the invention offers an excellent compromise between corrosion resistance and thermal conductivity.

A product according to the invention can further comprise one or more of the following optional characteristics:
  $ZrO_2 \geq 62.0\%$, or even $ZrO_2 \geq 63.0\%$, or even $ZrO_2 \geq 65.0\%$, and/or $ZrO_2 \leq 75.0\%$, or even $ZrO_2 \leq 74.0\%$, or even $ZrO_2 \leq 72.0\%$, or even $ZrO_2 \leq 71.4\%$, or even $ZrO_2 \leq 70.0\%$;
  $SiO_2 \geq 4.2\%$, or even $SiO_2 \geq 4.5\%$, or even $SiO_2 \geq 5.0\%$, and/or $SiO_2 \leq 9.5\%$, or even $SiO_2 \leq 9.0\%$, or even $SiO_2 \leq 8.0\%$, or even $SiO_2 \leq 7.5\%$;
  $Al_2O_3 \geq 12.0\%$, or even $Al_2O_3 \geq 14.0\%$, and/or $Al_2O_3 \leq 35.0\%$, or even $Al_2O_3 \leq 32.0\%$;
  The content of $Y_2O_3$ is less than or equal to 4.5%, or even less than or equal to 4.0%, or even less than or equal to 2.0%, or even less than 1.0%, or even less than 0.5%, or even less than 0.1%, or even approximately zero;
  The content of $Na_2O+K_2O+B_2O_3$ is greater than 0.4%, or even greater than 0.5%, and/or less than 1.6%, less than 1.5%, or even less than 1.4%, or even less than 1.2%;
  The content of $Na_2O$ is greater than 0.4%, or even greater than 0.5%, and/or less than 1.9%, less than 1.8%, less than 1.5%, or even less than 1.2%, or even less than 1.1%;
  The content of $K_2O$ is greater than 0.4%, or even greater than 0.5%, and/or less than 1.9%, less than 1.8%, less than 1.5%, or even less than 1.2%, or even less than 1.0%, or even less than 0.7%, or even less than 0.5%, or even less than 0.3%, or even less than 0.2%;
  The content of $B_2O_3$ is greater than 0.4%, or even greater than 0.5%, and/or less than 1.9%, less than 1.8%, less than 1.5%, or even less than 1.2%, or even less than 1.0%, or even less than 0.7%, or even less than 0.5%. In one embodiment, the content of $B_2O_3$ can also be less than 0.3%, or even less than 0.2%;
  The ratio of the contents by weight $ZrO_2/Al_2O_3$ is greater than 2.5, or even greater than 3.0;
  The ratio of the contents by weight $ZrO_2/Al_2O_3$ is less than 5.5, or even less than 5.0;
  The ratio of the contents by weight $SiO_2/Al_2O_3$ is less than 0.8, or even less than 0.5, or even less than 0.4, or even less than 0.3;
  The ratio of the contents by weight $SiO_2/(Na_2O+K_2O+B_2O_3)$ is greater than 5.5, or even greater than or equal to 6.0, or even greater than 6.5, or even greater than 7.0, or even greater than 8.0;

The ratio of the contents by weight $SiO_2/(Na_2O+K_2O+B_2O_3)$ is less than 15.0, or even less than 14.0, or even less than 13.0, or even less than 12.0, or even less than 11.0;

The ratio of the contents by weight $SiO_2/Na_2O$ is greater than 6.0, or even greater than 6.5, or even greater than 7.0, or even greater than 8.0;

The ratio of the contents by weight $SiO_2/Na_2O$ is less than 14.0, or even less than 13.0, or even less than 12.0, or even less than 11.0;

The "other oxide species" are impurities;

The content of "other oxide species" is less than or equal to 1.5%, or even less than 1.2%, or even less than 1.0%, or even less than 0.8%;

The content of CaO is less than 0.5%, or even less than 0.4%;

The content of MgO is less than 0.5%, or even less than 0.4%;

The content of SrO is less than 0.5%, or even less than 0.4%;

The content of BaO is less than 0.5%, or even less than 0.4%;

The average chemical composition, in percentage by weight based on the oxides and for a total of 100%, is as follows:
  $ZrO_2$: 60.0%-70.0%; and
  $SiO_2$: 4.0%-9.0%; and
  $Al_2O_3$: 18.8%-35.0%, and
  $Na_2O$: 0.4%-1.2% with $SiO_2/Na_2O$ between 7.0 and 12.0; and
  other oxide species: ≤1.0%;

The product is in the form of a block.

In one embodiment, the product according to the invention comprises yttrium oxide. It can then also have one or more of the preceding optional characteristics as well as one or more of the following optional characteristics:

The content of $Y_2O_3$ is greater than $50/ZrO_2$, or even greater than $60/ZrO_2$, or even greater than $70/ZrO_2$;

The content of $Y_2O_3$ is greater than or equal to 1.2%, or even greater than or equal to 1.5%, or even greater than or equal to 2.0%;

The ratio of the contents by weight $SiO_2/(Na_2O+K_2O+B_2O_3)$ is greater than $5.5 \times Y_2O_3$, or even greater than $6.0 \times Y_2O_3$;

The ratio of the contents by weight $SiO_2/Na_2O$ is greater than $5.5 \times Y_2O_3$, or even greater than $6.0 \times Y_2O_3$;

The average chemical composition, in percentage by weight based on the oxides and for a total of 100%, is as follows:
  $ZrO_2$: 60.0%-70.0%; and
  $SiO_2$: 4.0%-9.0%; and
  $Al_2O_3$: 14.8%-33.6%; and
  $Y_2O_3$: 2.0%-4.0%; and
  $Na_2O$: 0.4%-1.2% and
  other oxide species: ≤1.0%;

The thermal conductivity, for example evaluated as in the examples, is preferably greater than 3.00 W/m. ° C., preferably greater than 3.05 W/m. ° C., or even greater than or equal to 3.10 W/m. ° C.

The invention also relates to a method of manufacturing a refractory product according to the invention, comprising the following successive steps:

a) mixing raw materials, so as to form an initial charge, b) melting said initial charge until a bath of molten material is obtained, c) casting and solidification of said molten material, by controlled cooling, so as to obtain a fused refractory product, said method being remarkable in that said raw materials are selected so that said fused refractory product has a composition complying with that of a product according to the invention.

The invention finally relates to a glass-melting furnace comprising a product according to the invention, notably a product manufactured or that can have been manufactured by a method according to the invention, in particular in a region of the furnace in which the product is likely to come into contact with molten glass or with gases released by the melting of the glass, and notably in the superstructure (crown).

BRIEF DESCRIPTION OF THE DRAWINGS

Other aims, aspects, properties and advantages of the present invention will become clear from the description and the following examples and on examining the appended drawing in which.

DEFINITIONS

Figure 1:
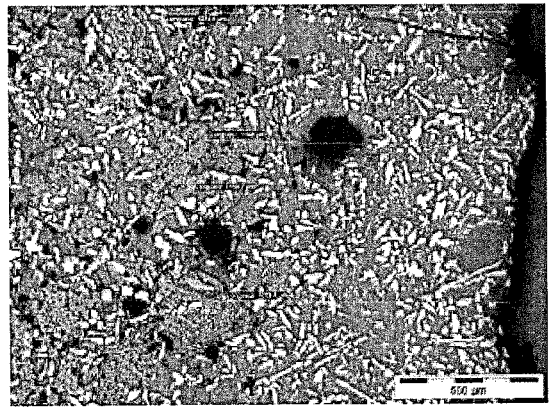
FIG. 1 shows a microstructure, observed in optical microscopy, of the sample of example 5* after testing.

In general, "fused product", "fused cast product" or "obtained by fusion" means a solid product, optionally annealed, obtained by complete solidification, by cooling, of a bath of molten material. A "bath of molten material" is a mass which, to preserve its shape, must be contained in a vessel. A bath of molten material, apparently liquid, can contain solid parts, but in an insufficient amount for them to be able to structure said mass.

A product according to the invention can contain hafnium oxide, $HfO_2$, naturally present in sources of zirconia. Its content by weight in the product according to the invention is less than or equal to 5.0%, generally less than or equal to 2.0%. "$ZrO_2$" conventionally denotes zirconia and these traces of hafnium oxide. $HfO_2$ therefore is not counted in the "other oxide species", but in "$ZrO_2$".

"Impurities" means the inevitable constituents, introduced necessarily with the raw materials or resulting from reactions with these constituents. In particular, the oxides of iron and of titanium are known to be harmful and their content must be limited to traces introduced as impurities with the raw materials. Preferably, the amount by weight of $Fe_2O_3+TiO_2$ is less than 0.55%, or even less than 0.20%.

In the formulas comprising a ratio (without unit) between percentages by weight of constituents, for example $SiO_2/(Na_2O+K_2O+B_2O_3)$ and a content (in percentage by weight) of another constituent, for example $5 \times Y_2O_3$, the relation is purely mathematical in order to delimit a range of compositions. The same applies to the formulas comprising the reciprocal of a content ($50/ZrO_2$) and a content ($Y_2O_3$).

Unless stated otherwise, all the percentages in the present description are percentages by weight based on the oxides.

DETAILED DESCRIPTION

A product according to the invention can be manufactured following steps a) to c) described below:

a) mixing raw materials so as to form an initial charge,
b) melting said initial charge until a bath of molten material is obtained,
c) solidification of said bath of molten material, by controlled cooling so as to obtain a refractory product according to the invention.

In step a), the raw materials are determined so as to guarantee a composition, in the finished product, that complies with the invention.

The presence of yttrium oxide can be useful in the products of the invention but its content must not exceed 5.0% otherwise the feasibility is degraded.

A content of $Y_2O_3$ greater than or equal to $50/ZrO_2$ can be useful for obtaining good resistance to corrosion by molten glass, notably at the level of the contact between two adjacent tank blocks. The presence of yttrium oxide makes it possible to lower the temperature of maximum expansion before change of phase, to reduce corrosion by molten glass and to increase the viscosity of this glass at this temperature. Thus, the risk of glass escaping at the interface of contact between two adjacent tank blocks is reduced.

The presence of sodium oxide and/or potassium oxide and/or boron oxide is necessary for endowing the vitreous phase with suitable physical and chemical properties. The content of $Na_2O+K_2O+B_2O_3$ must not, however, exceed a value such that $SiO_2/(Na_2O+K_2O+B_2O_3) \geq 6.0$ otherwise, at the operating temperatures of the glass-melting furnace, there is a risk of the vitreous phase flowing onto the surface of the product, which would thus lose its cohesion and its corrosion resistance. In one embodiment, $K_2O$ and/or $B_2O_3$ are only present as impurities.

The presence of calcium oxide and magnesium oxide is harmful in the products of the invention as they may generate crystals of calcium aluminate in the vitreous phase. The presence of these crystals can lead to defects of fracturing of the product. Moreover, an excessive content of CaO and/or MgO leads to dissolution of the zirconia crystals, which reduces the corrosion resistance of the product. Preferably, the content of CaO and/or of MgO does not exceed 0.5%.

The presence of barium oxide or strontium oxide is undesirable. Preferably, BaO and/or SrO are only present as impurities. Preferably, the content of BaO and/or of SrO does not exceed 0.5%.

In step b), melting is preferably carried out owing to the combined action of quite a long electric arc, not producing reduction, and of mixing promoting reoxidation of the products.

To minimize the formation of nodules with a metallic appearance and avoid the formation of cracks or crazing in the final product, it is preferable to conduct melting in oxidizing conditions.

Preferably, the method of long-arc melting used is that described in French patent No. 1 208 577 and its additions No. 75893 and 82310.

This method consists of using an arc furnace whose arc is struck between the charge and at least one electrode at a distance from this charge and controlling the length of the arc so that its reducing action is minimized, while maintaining an oxidizing atmosphere above the molten bath and of mixing said bath, either by the action of the arc itself, or by bubbling an oxidizing gas (air or oxygen, for example) into the bath, or else by adding oxygen-releasing substances, such as peroxides, to the bath.

In step c), the bath of molten material is preferably poured into a suitable mold for making a block. Cooling is preferably carried out at a rate of about 10° C. per hour.

Any conventional method of making AZS fused products intended for applications in glass-melting furnaces can be employed, provided that the composition of the initial charge makes it possible to obtain products having a composition complying with that of a product according to the invention.

A product according to the invention can constitute a proportion or the whole of a block.

The block can notably have a weight of more than 10 kg, of more than 20 kg, or even of more than 50 kg, of more than 150 kg, of more than 300 kg, or even of more than 900 kg and/or of less than 2 tonnes. In particular, it can have a weight of about 1 tonne.

The shape of the block is not limiting.

The block can have at least one dimension (thickness, length, or width) greater than 150 mm, preferably greater than 200 mm, or even greater than 400 mm, or even greater than 600 mm, or even greater than 800 mm or even greater than 1000 mm, or even greater than 1600 mm.

In an advantageous embodiment, the thickness, the length and the width of the block are greater than 150 mm, or even greater than 200 mm, or even greater than 300 mm, or even greater than 400 mm.

A product according to the invention can also be used in the form of a thin product, i.e. having a thickness between 50 and 150 mm, in particular a thickness less than 120 mm, or even less than 100 mm. It can notably be in the form of a slab.

Preferably, the block or slab forms part of or constitutes a wall or the floor of a furnace, especially of a glass-melting furnace.

Examples

The following nonlimiting examples are given for the purposes of illustrating the invention.

In these examples, the following raw materials were used:
zirconia CC10 sold by the Société Européenne des Produits Réfractaires mainly containing, on average by weight, 98.5% of $ZrO_2$, 0.5% of $SiO_2$ and 0.2% of $Na_2O$,
zircon sand at 33% of silica,
alumina of the AC44 type sold by the company Pechiney and containing on average 99.4% of $Al_2O_3$,
sodium carbonate containing 58.5% of $Na_2O$.

The products were prepared by the conventional method of arc furnace melting, and then cast to obtain blocks of format 200×400×150 mm³.

The chemical analysis of the products obtained is given in Tables 1 and 2; this is an average chemical analysis, given in percentage by weight. The impurities make up the complement to 100%.

Evaluation of Thermal Conductivity by the "Flash Lamp" Test (Test A)

Samples are taken from the prepared blocks in the form of tablets with a height of 5 mm and a diameter of 50 mm, and are then subjected to a temperature rise to 1000° C., during which the thermal diffusivity is measured. The thermal conductivity is then calculated; it is equal to the product of the thermal diffusivity, the measured density, and the specific heat. The thermal conductivity given in Tables 1 and 2 corresponds to measurements at 800° C.

Evaluation of Corrosion Resistance (Test B)

Samples are taken from the prepared blocks in the form of cylinders with a length of 100 mm and a diameter of 20 mm. These samples are kept immersed and rotating in a bath of molten glass for 200 hours at a temperature of 1450° C. in a glass of the soda-lime type for the examples in Table 1; for 100 hours at a temperature of 1550° C. in a soda-lime glass for the examples in Table 2; and for 100 hours at a temperature of 1550° C. in a glass of the borosilicate type for the examples in Table 3. The rotary speed about the axis of the sample holder was 1 revolution per minute (or a linear speed of 0.5 cm/s). Then the remaining volume of the sample is measured for each sample, and then, by means of the difference from the initial volume of the sample, the volume lost during the test.

The ratio of the volume lost by corrosion of the sample of the reference product (example 1 for Table 1*, example 5* for Table 2, example 9* for Table 3) to the volume lost by corrosion of a sample tested, multiplied by 100, gives an evaluation of the resistance to corrosion by glass of the sample tested relative to that of the reference product. "CI" denotes the corrosion index, thus defined.

CI is measured for different zones of the sample. The sample can be divided into 3 zones:

a first zone Z1, 35 mm long from the top of the sample: this first zone remains in the sample holder and is not submitted to corrosion;

a second zone Z-fl, 25 mm long underneath Z1, which corresponds to the portion located around the flux line;

a last zone Z-Im which corresponds to the rest of the sample.

"CI-Im" denotes the corrosion index of zone Z-Im, which therefore corresponds to the immersed portion of the sample, i.e. the portion only in contact with molten glass. It illustrates the corrosion resistance of the parts fully in contact with the glass, for example the floor or the throat of glassmaking furnaces.

"CI-fl" denotes the corrosion index of zone Z-fl, which therefore corresponds to the portion located around the flux line, i.e. the zone situated around the float line (level of the bath of molten glass) which is in contact both with the molten glass and with the atmosphere. It illustrates the corrosion resistance of the parts likely to see a "refractory product-glass-atmosphere" triple point, for example the tank or any part in which defects generate gas bubbles, notably the throat of glassmaking furnaces.

TABLE 1

| Ex. | $ZrO_2$ | $Al_2O_3$ | $SiO_2$ | $Na_2O + K_2O + B_2O_3$ | $ZrO_2/Al_2O_3$ | $SiO_2/(Na_2O + K_2O + B_2O_3)$ | Test A (W/m. ° C.) | CI-lm | CI-fl |
|---|---|---|---|---|---|---|---|---|---|
| | | | | | | | | (200 h-1450° C.) | |
| 1* | 53.0 | 35.0 | 9.2 | 1.0 | 1.5 | 9.2 | 3.19 | 100 | 100 |
| 2 | 64.5 | 26.0 | 7.0 | 1.0 | 2.5 | 7.0 | 3.10 | 117 | 125 |
| 3 | 66.2 | 27.5 | 4.9 | 0.6 | 2.4 | 8.7 | ND | 112 | 147 |
| 4* | 94.0 | 0.88 | 2.0 | 0.3 | 106.8 | 6.7 | ND | 106 | 118 |

TABLE 2

| Ex. | $ZrO_2$ | $Al_2O_3$ | $SiO_2$ | $Na_2O + K_2O + B_2O_3$ | $ZrO_2/Al_2O_3$ | $SiO_2/(Na_2O + K_2O + B_2O_3)$ | Test A (W/m. ° C.) | CI-lm | CI-fl |
|---|---|---|---|---|---|---|---|---|---|
| | | | | | | | | (100 h-1550° C.) | |
| 5* | 41.4 | 45.4 | 10.7 | 1.0 | 0.9 | 10.7 | 3.22 | 100 | 100 |
| 6 | 68.6 | 26.0 | 4.5 | 0.6 | 2.6 | 7.5 | 3.11 | 208 | 183 |
| 7 | 76.2 | 16.1 | 6.8 | 0.8 | 4.7 | 8.5 | 3.04 | 194 | 196 |
| 8* | 94.0 | 1.2 | 2.2 | 0.3 | 78.3 | 7.3 | 2.92 | 205 | 209 |

TABLE 3

| Ex. | $ZrO_2$ | $Al_2O_3$ | $SiO_2$ | $Na_2O + K_2O + B_2O_3$ | $ZrO_2/Al_2O_3$ | $SiO_2/(Na_2O + K_2O + B_2O_3)$ | Test A (W/m. ° C.) | CI-lm | CI-fl |
|---|---|---|---|---|---|---|---|---|---|
| | | | | | | | | (100 h-1550° C.) | |
| 9* | 41.4 | 45.4 | 10.6 | 1.0 | 0.9 | 10.6 | 3.20 | 100 | 100 |
| 10 | 66.6 | 25.1 | 5.7 | 1.0 | 2.7 | 5.7 | ND | 152 | 204 |
| 11 | 71.6 | 20.7 | 6.6 | 1.0 | 3.5 | 6.6 | ND | 139 | 278 |
| 12* | 96.0 | 0.9 | 2.1 | 0.3 | 109 | 7.0 | 2.93 | 134 | 350 |

*product not according to the invention:
ND: not determined

Whereas the corrosion resistance is usually linked to the content of zirconia, it can be seen that the examples of the invention make it possible to achieve an improved corrosion resistance relative to the reference product and at the same level, and even improved relative to products with much higher zirconia contents.

The examples of the invention also make it possible to achieve far higher thermal conductivity than that of the products with very high zirconia content.

The products of the invention therefore offer an excellent compromise between corrosion resistance and thermal conductivity, allowing significantly improved lifetimes to be achieved owing to greater stability of the molten glass/refractory product interface.

For a better understanding of the remarkable performance with respect to corrosion, the interface between the refractory products and glass was investigated.

Samples are taken from the prepared blocks in the form of self-crucibles: hollow cylinders with a total length of 50 mm, hollowed on 30 mm and with an outside diameter of 50 mm and inside diameter of 30 mm. These samples are filled, to a height of 20 mm, with glass of the soda-lime type kept molten for 10 hours at a temperature of 1450° C. Then, for each sample, the contents of zirconia and alumina of the glass are measured, at the interface (V0) between the refractory product and the glass, as well as at 200 μm from this interface (V200). These analyses are compared with the contents of zirconia and alumina of the glass before the test (V). The results are reported in Table 4. Then, from models based on measurements, the density (d) of the glass at 1400° C. as well as the viscosity (p) are calculated.

TABLE 4

| | V | | | | V0 | | | | V200 | | | |
|---|---|---|---|---|---|---|---|---|---|---|---|---|
| | $ZrO_2$ | $Al_2O_3$ | d | $\log(\mu)$ (Pa·s) | $ZrO_2$ | $Al_2O_3$ | d | $\log(\mu)$ (Pa·s) | $ZrO_2$ | $Al_2O_3$ | d | $\log(\mu)$ (Pa·s) |
| 5* | 0 | 1 | 2.31 | 0.98 | 2.0 | 30.1 | 2.41 | 4.30 | 1.7 | 23.4 | 2.38 | 3.66 |
| 6 | 0 | 1 | 2.31 | 0.98 | 2.2 | 25.6 | 2.39 | 4.13 | 1.3 | 12.8 | 2.35 | 3.22 |
| 8* | 0 | 1 | 2.31 | 0.98 | 15.0 | 6.0 | 2.57 | 1.43 | ND | ND | ND | ND |

It is observed for example 6 that:
the content of zirconia at the interface is far less than for example 8*; the increase in density is therefore significantly limited, which limits the renewal of the glass at the interface by gravity,
the glass at the interface has a viscosity close to that of example 5*, which promotes interface stability as a high viscosity prevents renewal of the interface due notably to the velocity of the glass, and
the content of alumina at the interface is not as high as for example 5*, which is favorable for limiting the Marangoni effect: enrichment of the glass with alumina causes the surface tension to increase and promotes natural convection of the glass due to the differences in surface tension.

All these elements lead to a certain stability of the interface between the refractory product and the molten glass and therefore limit the corrosion of the refractory product.

Figures 2A, 2B:
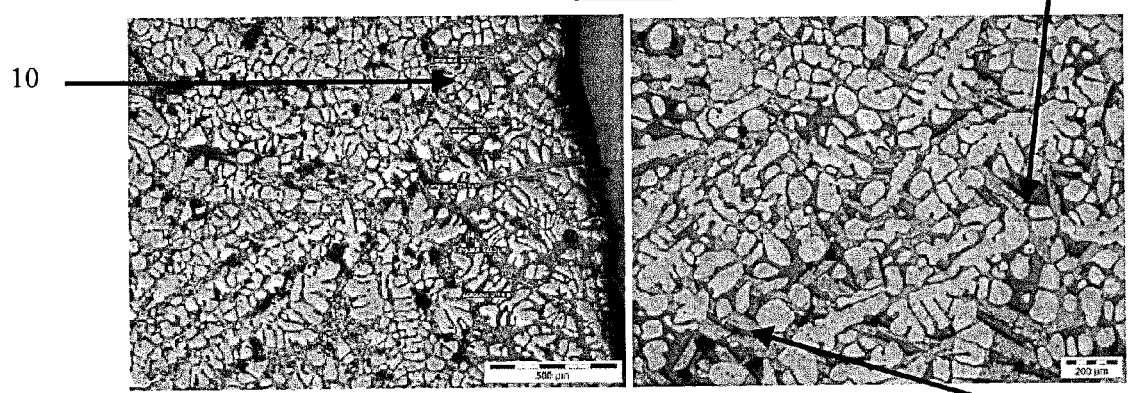
FIGS. 2a and 2b show a microstructure, observed in optical microscopy, of the sample of example 6 according to the invention after testing, at two different magnifications.
Figure 3:
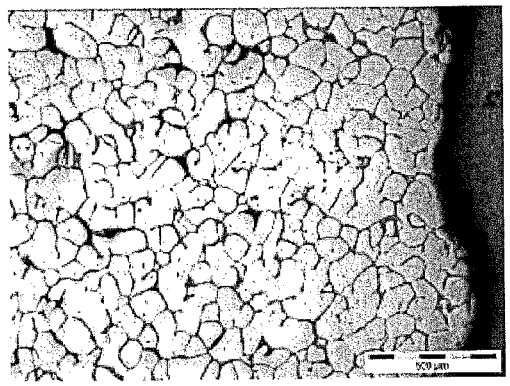
FIG. 3 shows a microstructure, observed in optical microscopy, of the sample of example 8* after testing.

Observation of the self-crucible with the light microscope after testing, illustrated in FIGS. 1 to 3, shows that the products of the invention have a remarkable microstructure. In fact, the products of the invention, for example from example 6, a microstructure of which is shown in FIG. 2, have the advantage that they have dendritic zirconia crystals 10 as well as elongated crystals of corundum 11 and of corundum-zirconia eutectic 12, inducing a highly interpenetrating microstructure that contributes to the stability of the interface with the glass by providing better resistance to the movements of convection at the surface and therefore better resistance to corrosion by the glass.

Without being bound by a theory, the inventors think that when the alumina content is such that $ZrO_2/Al_2O_3$ is less than 2.0, the refractory product has high solubility, which has an adverse effect on the corrosion resistance. Moreover, this solubility leads to the generation of defects in the molten glass, and in particular to local variations of density.

The inventors also consider that when the $ZrO_2/Al_2O_3$ ratio is greater than 6.0, the alumina content is too low to passivate the zirconia, which also has an adverse effect on the corrosion resistance.

Of course, the present invention is not limited to the embodiments described, which are given as illustrative, non-limiting examples.

In particular, the products according to the invention are not limited to particular shapes or dimensions, nor to application to glassmaking furnaces.

The invention claimed is:

1. A fused refractory product having the following chemical composition, in percentage by weight based on the oxides and for a total of 100%:
   $ZrO_2$: 60.0%-80.0%;
   $SiO_2$: 4.0%-9.5%
   $Al_2O_3$: complement to 100%;
   $Y_2O_3 \leq 5.0\%$;
   other oxide species: $\leq 2.0\%$; and
   the ratio of the contents by weight $ZrO_2/Al_2O_3$ being at least 2.0 and less than 5.0.

2. The product as claimed in claim 1, in which
   $ZrO_2 \leq 75.0\%$, and
   $SiO_2/(Na_2O+K_2O+B_2O_3) \geq 6.0$, and
   other oxide species: $\leq 1.5\%$.

3. The product as claimed in claim 1, in which
   $ZrO_2$: 62.0%-75.0%, and/or
   $2.5 < ZrO_2/Al_2O_3 < 5.0$, and/or
   $SiO_2$: 4.2%-9.5%, and/or
   $Na_2O+K_2O+B_2O_3 > 0.4\%$ and $SiO_2/(Na_2O+K_2O+B_2O_3) \geq 6.5$.

4. The product as claimed in claim 1, in which
   $ZrO_2$: 65.0%-72.0%, and/or
   $3.0 < ZrO_2/Al_2O_3 < 5.0$, and/or
   $SiO_2$: 4.5%-9.0%, and/or
   $Na_2O+K_2O+B_2O_3 > 0.5\%$ and $SiO_2/(Na_2O+K_2O+B_2O_3) \geq 7.0$.

5. The product as claimed in claim 1, in which
   $ZrO_2 \leq 70.0\%$, and/or
   $SiO_2$: 5.0%-8.0%, and/or
   $SiO_2/(Na_2O+K_2O+B_2O_3) \geq 8.0$.

6. The product as claimed in claim 1, in which the content of $B_2O_3$ is greater than 0.4%.

7. The product as claimed in claim 1, in which the ratio of the contents by weight $SiO_2/Al_2O_3$ is less than 0.8.

8. The product as claimed in claim 7, in which the ratio of the contents by weight $SiO_2/Al_2O_3$ is less than 0.4.

9. The product as claimed in claim 1, in which the content of $Y_2O_3$ is greater than $50/ZrO_2$.

10. The product as claimed in claim 1, in which the ratio of the contents by weight $SiO_2/(Na_2O+K_2O+B_2O_3)$ is greater than $5.5 \times Y_2O_3$.

11. The product as claimed in claim 1, in which the chemical composition, in percentage by weight based on the oxides and for a total of 100%, is as follows:
- $ZrO_2$: 60.0%-70.0%; and
- $SiO_2$: 4.0%-9.0%; and
- $Al_2O_3$: 18.8%-35.0%; and
- $Na_2O$: 0.4%-1.2% with $SiO_2/Na_2O$ between 7.0 and 12.0, and
- other oxide species: ≤1.0%.

12. The product as claimed in claim 1, in which the chemical composition, in percentage by weight based on the oxides and for a total of 100%, is as follows:
- $ZrO_2$: 60.0%-70.0%; and
- $SiO_2$: 4.0%-9.0%; and
- $Al_2O_3$: 14.8%-33.6%; and
- $Y_2O_3$: 2.0%-4.0%; and
- $Na_2O$: 0.4%-1.2%; and
- other oxide species: ≤1.0%.

13. The product as claimed in claim 1, being in the form of a block.

14. A glass-melting furnace comprising the product as claimed in claim 1, in a region of the furnace in which the product may tend to come into contact with molten glass or with gases released by the melting of the glass, and notably in the superstructure.

15. The product as claimed in claim 1, in which the ratio of the contents by weight $SiO_2/(Na_2O+K_2O+B_2O_3)$ is less than 15.0.

16. The product as claimed in claim 1, in which $Na_2O+K_2O+B_2O_3<1.2\%$.

* * * * *